(12) United States Patent
Kinser et al.

(10) Patent No.: US 8,538,613 B2
(45) Date of Patent: Sep. 17, 2013

(54) METHOD FOR DETERMINING AN ESTIMATED DRIVING RANGE FOR A VEHICLE

(75) Inventors: Christopher A. Kinser, Grand Blanc, MI (US); Matthew A. Herrmann, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 12/945,947

(22) Filed: Nov. 15, 2010

(65) Prior Publication Data

US 2012/0123618 A1    May 17, 2012

(51) Int. Cl.
*B60L 15/00* (2006.01)
(52) U.S. Cl.
USPC .............................................. 701/22; 903/902
(58) Field of Classification Search
USPC ................ 701/22, 57–59, 99, 123; 180/65.1, 180/65.21, 65.29; 903/902, 908; 702/60, 702/63, 179, 193, 199; 700/291
See application file for complete search history.

(56) References Cited

U.S. PATENT DOCUMENTS

| 8,138,720 B2 * | 3/2012 | Snyder et al. ................. 320/127 |
| 8,214,097 B2 * | 7/2012 | Severinsky et al. ............ 701/22 |
| 2010/0109856 A1 | 5/2010 | Kuenzner |

FOREIGN PATENT DOCUMENTS

| DE | 10146318 A1 | 4/2003 |
| DE | 102008054008 A1 | 5/2010 |

OTHER PUBLICATIONS

German Office Action dated Jun. 20, 2012, (6 pages).

\* cited by examiner

*Primary Examiner* — Dalena Tran
(74) *Attorney, Agent, or Firm* — Lionel D. Anderson; Reising Ethington P.C.

(57) ABSTRACT

A method for determining an estimated driving range for a vehicle that uses battery power for vehicle propulsion, where the estimate is in the form of a range of values as opposed to a single value. In one embodiment, the method adds a positive offset value to an initial estimate value to determine an upper limit, and subtracts a negative offset value from the initial estimate value to determine a lower limit. The positive and negative offset values may be determined separately and on a real-time basis so that the extent of the overall estimated driving range may be influenced by the volatility in power consumption and/or power creation.

21 Claims, 4 Drawing Sheets

US 8,538,613 B2

METHOD FOR DETERMINING AN ESTIMATED DRIVING RANGE FOR A VEHICLE

TECHNICAL FIELD

The present invention generally relates to vehicles and, more particularly, to methods for determining estimated driving ranges for vehicles that use battery power for vehicle propulsion.

BACKGROUND

Some vehicles provide an estimated driving range in the form of a single value (e.g., miles until empty). This single value is displayed on the vehicle's instrument panel, and can be beneficial by providing the driver with an estimate as to how far the vehicle can be driven before running out of fuel. However, such an estimate is only accurate so long as the vehicle continues to be driven in a similar or constant manner. For example, if the driver transitions from highway to city driving, then the estimated driving range could change significantly.

SUMMARY

According to one embodiment, there is provided a method for determining an estimated driving range for a vehicle. The method may comprise the steps of: (a) determining an available energy for a battery that may be used for vehicle propulsion; (b) using the available energy to determine an instantaneous rate of change for the battery; (c) using the instantaneous rate of change to determine an average rate of change for the battery; and (d) using the instantaneous rate of change and the average rate of change to determine the estimated driving range for the vehicle, wherein the estimated driving range may include a range of values that is influenced by the volatility in power consumption and/or power creation regarding the battery.

According to another embodiment, there is provided a method for determining an estimated driving range for a vehicle. The method may comprise the steps of: (a) determining an initial range estimate for a battery that may be used for vehicle propulsion; (b) determining a negative offset and subtracting the negative offset from the initial range estimate to determine a lower range limit; (c) determining a positive offset and adding the positive offset to the initial range estimate to determine an upper range limit; and (d) providing an estimated driving range to a user interface in the vehicle, wherein the estimated driving range includes the lower range limit and the upper range limit.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The method described below may determine an estimated driving range for a vehicle that uses battery power for vehicle propulsion, where the estimate is in the form of a range of values as opposed to a single value. As previously mentioned, the estimated driving range can be significantly impacted by the manner in which the vehicle is driven. By providing an estimated driving range in the form of a range of values that are bound by upper and lower limits, the present method may provide the driver with more useful estimates. In one embodiment, the method adds a positive offset value to an initial estimate value to determine an upper limit, and subtracts a negative offset value from the initial estimate value to determine a lower limit. The positive and negative offset values may be determined separately so that the extent of the overall range is influenced by the volatility in power consumption and/or power creation. In periods of low volatility (i.e., rather consistent and steady power consumption or creation), the overall estimated driving range is rather tight (the method is more confident of the estimate and therefore provides a narrower range). In periods of high volatility, the overall estimated driving range is rather broad, as the method is less confident in its estimate and thus needs a broader range to account for this. The following explanation of exemplary method 100 is provided in conjunction with the block diagram shown in FIG. 2, the graphs shown in FIG. 3, and the estimated driving range presentation shown in FIG. 4.

Figure 1:
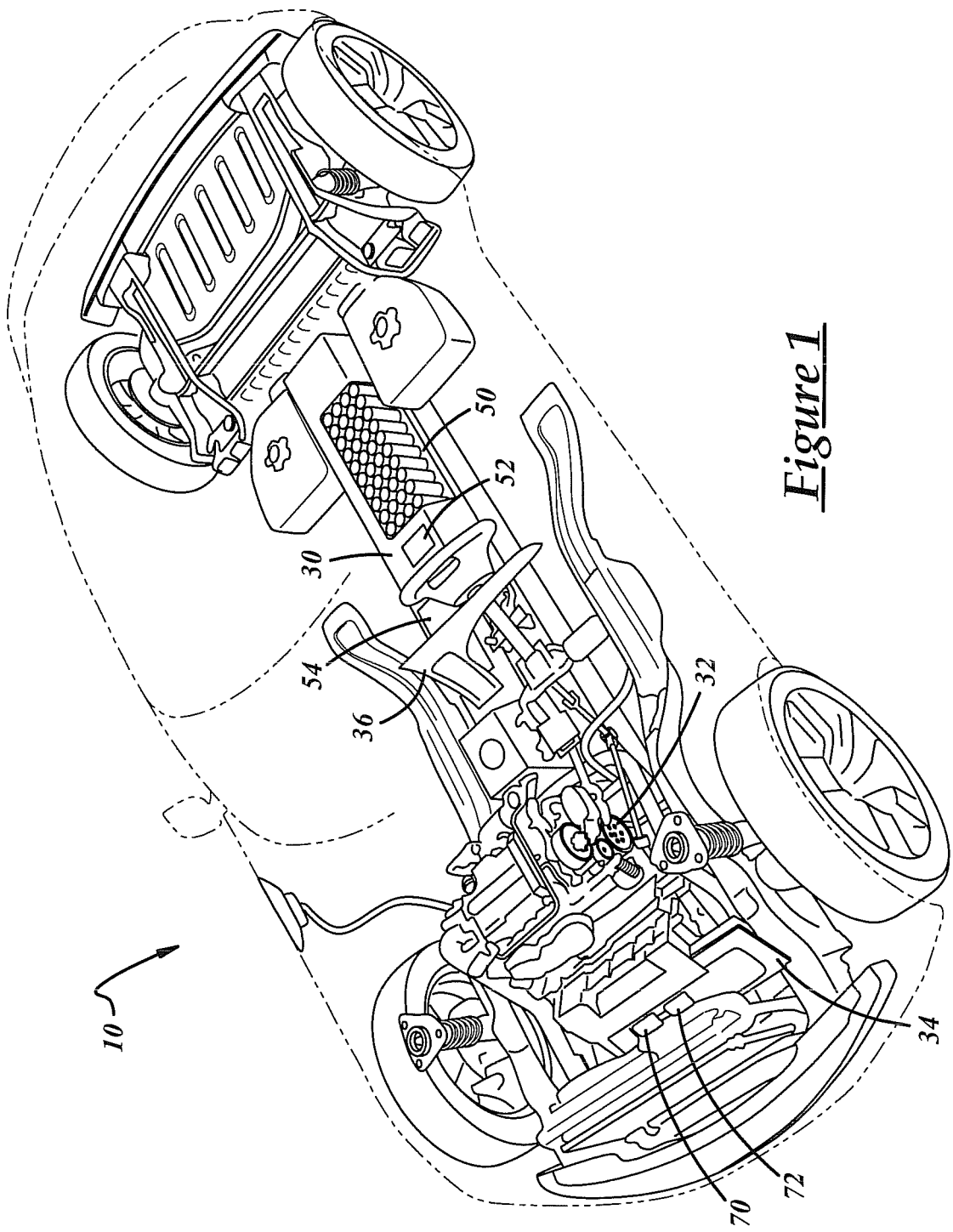
FIG. 1 is a perspective view depicting an exemplary vehicle.

With reference to FIG. 1, there is shown portions of an exemplary vehicle 10, for which an estimated driving range may be determined. It should be appreciated that FIG. 1 is only a schematic representation of certain portions of a vehicle and that the method described herein could be used with any number of different vehicles and systems and is not limited to the exemplary one shown here. For example, the method described below can be used with a hybrid electric vehicle (HEV), a plug-in hybrid electric vehicle (PHEV), an extended-range electric vehicle (EREV), a battery electric vehicle (BEV), or any other vehicle that uses battery power for vehicle propulsion. According to this particular embodiment, vehicle 10 generally includes a battery 30, an electric motor 32, a control module 34, and a user interface 36.

Battery 30 may store electrical energy that is used to drive electric motor 32, as well as to meet other electrical needs of the vehicle. According to an exemplary embodiment, battery 30 includes a high-voltage battery pack 50 (e.g., 40V-600V), a sensor unit 52, and a control unit 54. Battery pack 50 may include a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 30 should be designed to withstand repeated charge and discharge cycles and may be used in conjunction with other energy storage devices, such as capacitors, super capacitors, inductors, etc. Those skilled in the art will appreciate that battery 30 may be provided according to any number of different embodiments, may be connected in any number of different configurations, and may include any number of different components, like sensors, control units and/or any other suitable components known in the art.

Battery sensor unit 52 may include any variety of different sensing components or elements, and may monitor battery conditions such as battery voltage, current, state of charge (SOC), state of health (SOH), temperature, etc. These sensors may be integrated within battery unit 30 (e.g., an intelligent or smart battery), they may be external sensors located outside of the battery unit, or they may be provided according to some other known arrangement. The battery sensors may monitor and determine the battery voltage, current, SOC, SOH, temperature, etc. on a cell-by-cell basis, as an average of a collection or block of cells or region of the battery unit, as an average of the entire battery unit, or according to some other method known in the art. Output from battery sensor unit 50 may be provided to control unit 54, control module 34, or some other appropriate device.

Battery Control unit 54 may include any variety of electronic processing devices, memory devices, input/output (I/O) devices, and other known components, and may perform various control and/or communication related functions. For example, control unit 54 could receive sensor signals from battery sensor unit 52, package the sensor signals into an appropriate sensor message, and send the sensor message to control module 34 over an appropriate connection, such as a CAN bus, a system management bus (SMBus), a proprietary communication link, or any other communication means known to those skilled in the art. It is possible for control unit 54 to gather battery sensor readings and store them in local memory so that a comprehensive sensor message can be provided to control module 34 at a later time, or the sensor readings can be forwarded to module 34 or some other destination as soon as they arrive at control unit 54, to cite a few possibilities. In another capacity, battery control unit 54 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Electric motor 32 may use electrical energy stored in battery 30 to drive one or more vehicle wheels, which in turn propels the vehicle. While FIG. 1 schematically depicts electric motor 32 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. System 10 is not limited to any one particular type of electric motor, as many different motor types, sizes, technologies, etc. may be used. In one example, electric motor 32 includes an AC motor (e.g., a three-phase AC induction motor, a multi-phase AC induction motor, etc.) as well as a generator that can be used during regenerative braking. Electric motor 32 may be provided according to any number of different embodiments (e.g., AC or DC motors, brushed or brushless motors, permanent magnet motors, etc.), may be connected in any number of different configurations, and may include any number of different components, like cooling features, sensors, control units and/or any other suitable components known in the art.

Control module 34 may be used to control, govern or otherwise manage certain operations or functions of vehicle 10 and, according to one exemplary embodiment, includes a processing device 70 and a memory device 72. Processing device 70 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 72 may include any type of suitable electronic memory means and may store a variety of data and information. This includes, for example: sensed vehicle conditions; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory device 72. Control module 34 may be electronically connected to other vehicle devices and modules via I/O devices and suitable connections, like a communications bus, so that they can interact as required. These are, of course, only some of the possible arrangements, functions and capabilities of control module 34, as others are certainly possible. Depending on the particular embodiment, control module 34 may be a stand-alone electronic module (e.g., a vehicle integration control module (VICM), a traction power inverter module (TPIM), a battery power inverter module (BPIM), etc.), it may be incorporated or included within another electronic module in the vehicle (e.g., a power train control module, an engine control module, etc.), or it may be part of a larger network or system (e.g., a battery management system (BMS), a vehicle energy management system, etc.), to name a few possibilities.

User interface 36 may include any variety of different software and/or hardware components to exchange information between the vehicle and a user. This includes, for example, output components like a visual display, an instrument panel, or an audio system where user interface 36 provides information to a vehicle user. This also includes input components like a touch-screen display, a microphone, a keyboard, a pushbutton or other control where user interface 36 receives information from a vehicle user. In some cases, user interface 36 includes components with both input and output capabilities, such as a visual interface and an audible interface. A visual interface may include any suitable interface that is located within the vehicle and visually presents information to and/or receives information from a vehicle user, and it may be driven by a sequence of navigable menus that enable the user to exchange information with the vehicle. A visual touch-screen display is one example of a suitable visual interface. Likewise, an audible interface may include any suitable interface that is located within the vehicle and audibly presents information to and/or receives information from a user, and it may be part of an on-board automated voice processing system that uses voice-recognition and/or other human-machine interface (HMI) technology. User interface 36 may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); it may be integrated within an existing audio system; or it may simply include an electronic connection or port for connecting with a laptop or other computing device, to cite a few examples.

As explained below in more detail, user interface 36 may be used by the present method to provide information in a graphical form from the vehicle to a vehicle user. For instance, user interface 36 may provide an estimated driving range, charging status, instant consumption, average consumption, reports and/or other output to a vehicle user. Other user interfaces may be used instead, as the exemplary user interface shown and described herein represents only one possibility. The present method may utilize any user interface to provide information from the vehicle to a vehicle user, and is not limited to any particular type.

Figure 2:
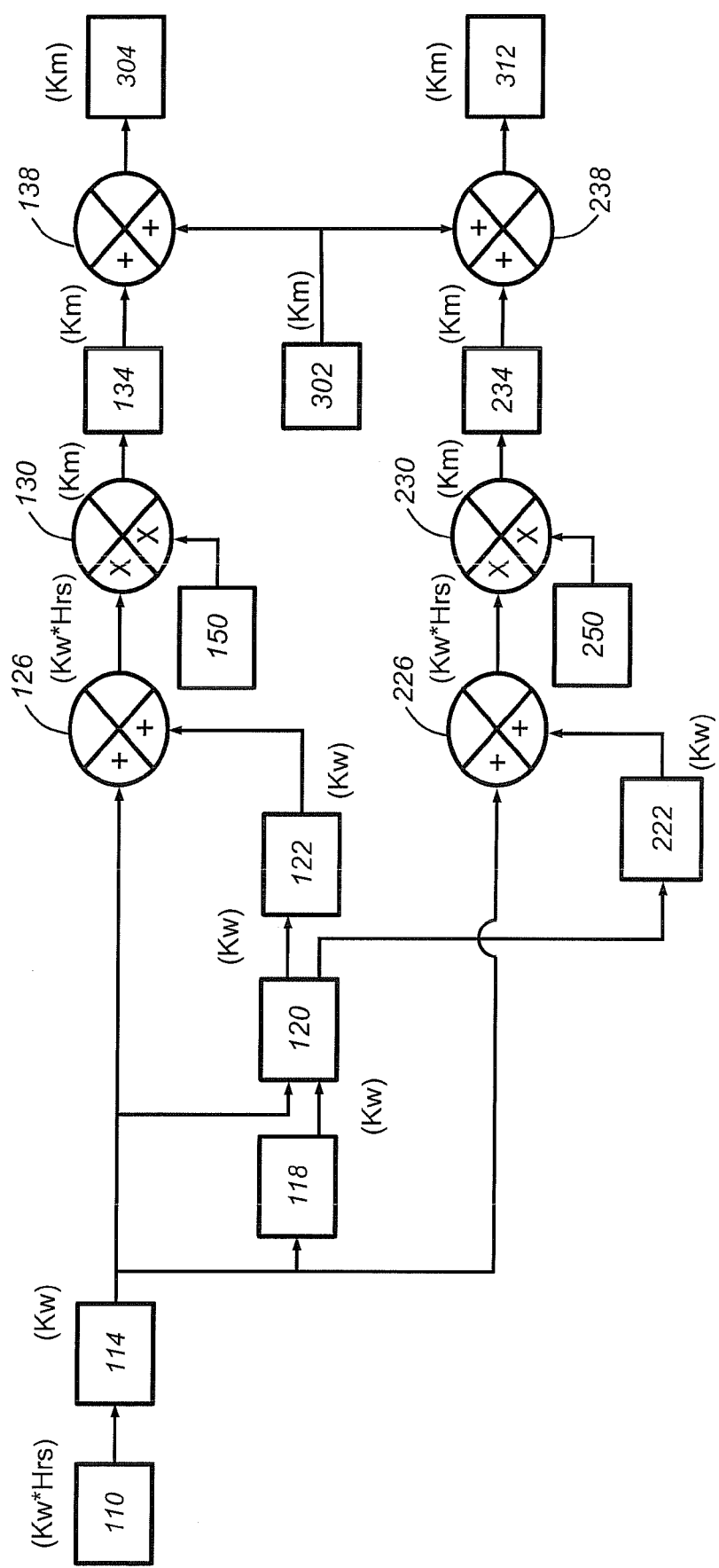
FIG. 2 is a block diagram illustrating some of the steps of an exemplary method that may be used to determine an estimated driving range for a vehicle, such as the one shown in FIG. 1.

Turning now to FIG. 2, there is shown an exemplary method 100 for determining an estimated driving range for a vehicle that uses battery power for vehicle propulsion, where the estimate is in the form of a range of values as opposed to a single value. As previously mentioned, the estimated driving range can be significantly impacted by the manner in which the vehicle is driven (e.g., aggressive versus passive driving, highway versus city driving, etc.). By providing an estimated driving range in the form of a range of values that are bound by upper and lower limits, the present method may provide the driver with more useful estimates. In one embodiment, method 100 adds a positive offset value to an initial estimate value to determine an upper limit, and subtracts a negative offset value from the initial estimate value to determine a lower limit. The upper and lower limits define the estimated driving range, which may be provided to the vehicle user in the form of a visual presentation via user interface 36. The following explanation of exemplary method 100 is provided in conjunction with the block diagram shown in FIG. 2 and the graphs shown in FIG. 3.

Figure 3:
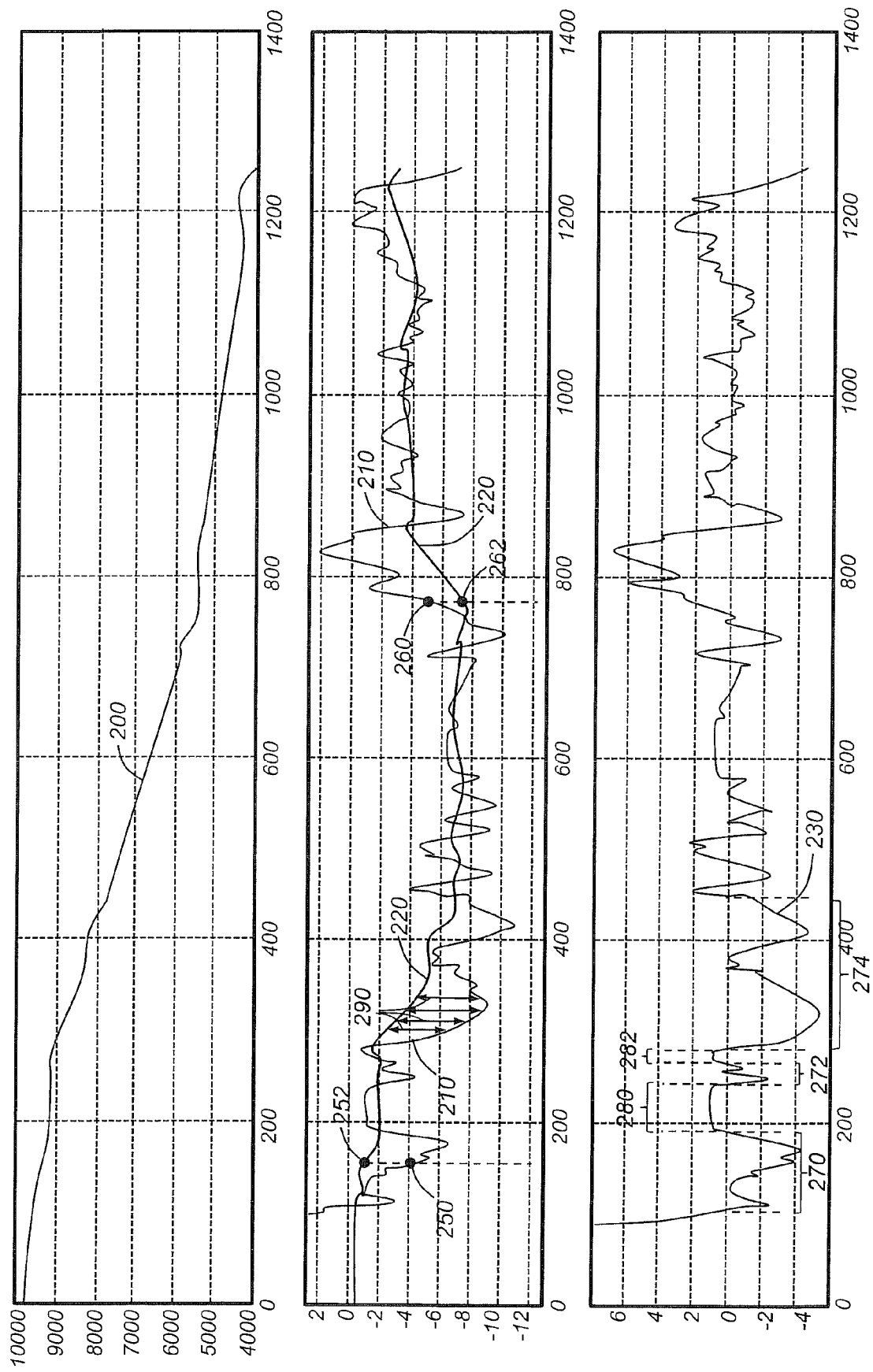
FIG. 3 shows several exemplary plots that help illustrate some of the techniques that may be used by the method of FIG. 2.
Figure 4:
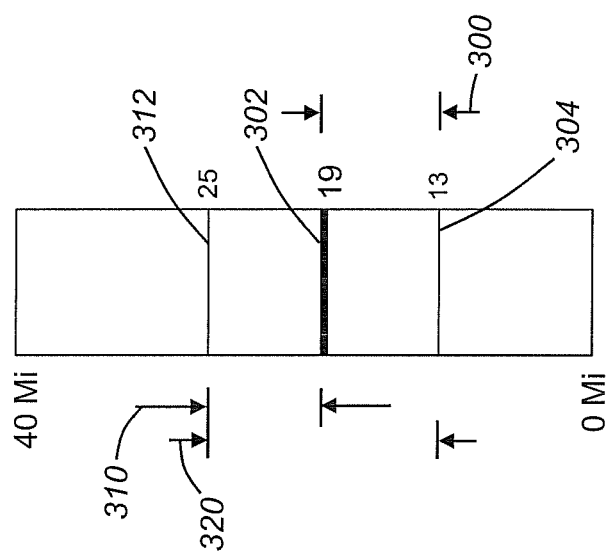
FIG. 4 shows an exemplary presentation of an estimated driving range that may be presented via a user interface.

Beginning with step 110, the method starts by determining the available energy in battery 30. The available or remaining energy may be determined in one of a variety of different ways. In one embodiment, battery sensor unit 52 measures or otherwise senses the battery voltage, current, state of charge (SOC), state of health (SOH) and/or temperature, and provides this information to control module 34. Control module 34, in turn, uses this information to determine the 'available energy' which corresponds to the amount of energy available or left in battery 30. In another embodiment, control module 34 determines the available energy in battery 30 by obtaining an available energy reading from some other component, device, module and/or system (e.g., a vehicle integration control module (VICM)) that is in possession of such information. It is not necessary that control module 34 determine the available energy, as this calculation could be performed by some other device, such as battery control unit 54. Step 110 may express the available energy in any suitable form, such as in kilowatt hours (Kw*Hrs). With reference to FIG. 3, there is shown an exemplary plot 200 which represents the available energy in battery 30 (y-axis) as a function of time (x-axis). This plot is only provided for purposes of illustration and is in no way meant to limit the scope or application of exemplary method 100.

Next, step 114 determines an instantaneous rate of change for the available energy in battery 30. Like many of the steps in method 100, step 114 may be performed in any number of different ways. For instance, it is possible for step 114 to determine an 'instantaneous rate of change' by taking the derivative of the available energy, as a function of time (d/dt). The instantaneous rate of change generally corresponds to the rate of energy usage in battery 30, and is illustrated in FIG. 3 with exemplary plot 210. Stated differently, plot 210 represents the rate of change or the slope of plot 200. Declining segments of plot 200 represent battery discharge events (e.g., vehicle propulsion) and are represented in plot 210 with negative values; inclining segments of plot 200 represent battery charge events (e.g., regenerative braking) and are represented in plot 210 with positive values; and flat segments of plot 200 represent battery neutral events (e.g, coasting along) and are represented in plot 210 with values of zero. One can see from both plots 200 and 210 that battery 30 is discharging during most of this exemplary time period. Segments where battery 30 is being rapidly discharged or charged are represented in plot 210 in the form of peaks and valleys, as these correspond to periods of increased battery charge volatility. Step 114 may express the instantaneous rate of change in any suitable form, such as in kilowatts (Kw). Also, step 114 may perform some degree of basic signal processing, including light filtering, as the output of this step is intended to be a "generally" unfiltered or instantaneous rate of change.

Step 118 filters, smoothes, or otherwise manipulates the instantaneous rate of change data that was determined in the previous step, and may do so according to a number of different techniques. For example, step 118 may apply some type of filtering or smoothing function to plot 210, in order to arrive at an 'average rate of change', such as that illustrated by plot 220. One can see from these exemplary plots that many of the peaks and valleys of plot 210 have been smoothed over by the more gradual segments of plot 220. Skilled artisans will appreciate that various filtering, smoothing or other signal processing techniques may be employed by step 118 including, but certainly not limited to, low-pass, high-pass and band-pass filters, $1^{st}$-, $2^{nd}$- and $3^{rd}$-order filters, Butterworth, Kalman and Savitzky-Golay filters, local regression techniques, moving averages, Kernel and Laplacian smoothers, etc. In one embodiment, step 118 employs a low-pass, $1^{st}$-order filter with a low cutoff frequency (e.g., 0.25 Hz) to produce the average rate of change illustrated by plot 220. However, other filters and filtering techniques can be used instead. Step 118 may express the average rate of change in any suitable form, such as in kilowatts (Kw).

Next, step 120 compares the instantaneous rate of change (plot 210) to the average rate of change (plot 220) and determines an 'error' (plot 230), which can have negative and/or positive values. The error (plot 230) generally refers to the difference or delta between the instantaneous and average rates of change, which is illustrated in FIG. 3 with arrows 290. The 'negative error' generally refers to those error values that are less than zero; that is, points along plot 210 where the y-axis value is less than that of a corresponding point along plot 220, where both points have the same x-axis value. To illustrate, consider points 250, 252, which both have the same x-axis value. Point 250 is part of plot 210 (instantaneous rate of change), and point 252 is part of plot 220 (average rate of change). Because point 250 has a smaller y-axis value than point 252 (i.e., is located below point 252 on the graph), then this value or point is part of the negative error. The opposite is true for points 260, 262, which correspond to a 'positive error' because point 260 along plot 210 has a larger y-axis value than point 262 on plot 220. Points along plots 210 and 220 that have the same y-axis value result in a delta or error value of zero. Step 120 may express the error in any suitable form, such as in kilowatts (Kw).

Once the error has been determined, step 122 extracts, identifies or otherwise determines the 'negative error'. As mentioned above, the negative error generally refers to those error values that are less than zero. If step 122 encounters values or points along plot 230 that correspond to a positive error (i.e., are greater than zero), then those portions of plot 230 can be truncated or cut off at the zero mark (see segments 280, 282). For example, segments 270, 272 and 274 correspond to a negative error, while segments 280 and 282 correspond to a positive error. This evaluation of error plot 230 may be performed for the entire plot or it may be performed on just a segment of the plot. In the exemplary embodiment illustrated in FIG. 2, the negative and positive errors are determined separately; however, in another embodiment, they may be determined at the same time. Step 122 may express the negative error in any suitable form, such as in kilowatts (Kw).

In step 126, the negative error (plot 230) is evaluated with the instantaneous rate of change (plot 210) in order to determine a 'negative volatility'. A variety of different techniques may be used to perform this step. In one embodiment, step 126 examines plots 210 and 230 in order to determine how much and how often the instantaneous rate of change differs from the average rate of change, or at least the negative portions thereof. This step may use calculations that behave as a decaying sum—as the negative portions increase, so does the total sum or area under the curve. Without further stimulation from 'negative volatility', the sum may decrease with time. In a sense, step 126 may be used to gauge the volatility or the amount of fluctuation in power consumption. If battery 30 were discharged in a slow and steady manner, then the one would expect the instantaneous rate of change (plot 210) to be fairly consistent with the negative portions of the error (plot 230), and therefore produce a rather small negative volatility; this corresponds to a relatively low power consumption volatility. Conversely, if battery 30 experienced periods of sudden and rapid charge depletion, then this would likely lead to a rather large negative volatility; this corresponds to a relatively high power consumption volatility. This volatility factor may subsequently impact the estimated driving range of the vehicle, as will be explained. Step 126 may express the negative volatility in any suitable form, such as in kilowatt hours (Kw*Hrs).

Step 130 scales or otherwise converts the negative volatility from the previous step into a 'negative offset'. According to the exemplary embodiment described above, step 126 produces a negative volatility value or factor that is in units of energy, like kilowatt hours (Kw*Hrs), but the estimated driving range that method 100 ultimately seeks to determine is in units of distance, such as kilometers (Km). Thus, a conversion needs to take place to convert from energy to distance and, hence, negative volatility to negative offset. Step 130 may perform this conversion according to a number of different techniques, including using a calibration approach that uses stored empirical data. For example, a lookup table 150 or other data structure may be maintained in memory device 72 or some other appropriate location on the vehicle, where the data structure stores scaling calibration data that is empirically determined by driving the car around and evaluating the relationship between energy and distance. In a different embodiment, scaling data is based on predetermined or known relationships between different units, as opposed to being empirically determined. Of course, other techniques for scaling or converting units may also be used, as the preceding example is only one possibility. Thus, step 130 may express the negative offset in any suitable form, such as in kilometers (Km) or miles.

An optional filtering step 134 may be used to smooth or otherwise filter the negative offset. This may prevent abrupt and instantaneous changes in the negative offset value. According to an exemplary embodiment, optional step 134 uses a first-order filter to filter or process the negative offset determined in the previous step. Other filters and filtering techniques may be used instead.

Next, step 138 subtracts the negative offset from an 'initial range estimate' 302 in order to arrive at a 'lower range limit'. Skilled artisans will appreciate that numerous techniques may be used to provide an initial range estimate, which is a single-value estimate for the range or distance left before the vehicle needs to be recharged, refueled, etc. Method 100 is not limited to any particular method or technique for determining an initial range estimate, which may be provided by control module 34 or some other source. According to an exemplary embodiment, step 138 uses both a short term filter (e.g., 8 mile range) and a long term filter (e.g., 80 mile range) to generate the initial range estimate, however, other techniques may be used instead. For example, step 138 may use a Federal Transportation Procedure (FTP) range (e.g., average energy per mile), a moving average, a battery energy estimate, or some other suitable range prediction method. Consider the example illustrated in FIG. 4, where the negative offset value 300 from the previous step is 6.0 miles and the initial range estimate 302 from control module 34 is 19.0 miles; step 138 subtracts the 6.0 miles from the 19.0 miles to arrive at a lower range limit 304 of 13.0 miles.

A similar process may be used to determine a 'positive offset', which is added to the same initial range estimate to arrive at an 'upper range limit'. For example, step 222 may receive error information from step 120 and produce a 'positive error', in much the same way as step 122 produces a negative error and as described above in greater detail. Step 226 may then receive the positive error from step 222 and the instantaneous rate of change from step 114, and use this information to generate a 'positive volatility', as was similarly done in step 126. In a sense, the positive volatility is representative of the volatility or variance in power creation. The positive volatility value may then be converted in step 230 into a 'positive offset' using a lookup table 250, which may be optionally filtered at step 234 before being provided to step 238. Step 238 may add the positive offset to the initial range estimate in order to arrive at an upper range limit. Because of the similarity between steps 122, 222; 126, 226; 130, 230; 134, 234; and 138, 238, respectively, separate descriptions of the corresponding steps used to determine the upper range limit have been omitted. The descriptions provided above in conjunction with the lower range limit apply to steps 222, 226, 230, 234 and 238 as well.

Continuing with the example from above, assume that the positive offset value 310 is 4.0 miles. Step 238 adds 4.0 miles to 19.0 miles to arrive at an upper range limit 312 of 23.0 miles. This results in an overall estimated driving range 320 of 13.0 to 23.0 miles, where the extent or expanse of the overall range is influenced by the volatility in power consumption and power creation. In periods of low volatility (i.e., rather consistent and steady power consumption or creation), the overall estimated driving range 320 may be rather tight (the method is more confident of the estimate and therefore provides a tighter or narrower range). In periods of high volatility, the overall estimated driving range 320 may be rather broad, as the method is less confident in its estimate or prediction and thus needs a broader range to account for this.

If the estimated driving range becomes quite low because battery 30 is almost out of charge, a clipping function or the like may be used to clip, truncate or otherwise modify the lower range limit 304. For instance, if the initial range estimate 302 is at 3.0 miles and the negative offset 300 is 4.0 miles, in the absence of a clipping function this would result in a lower range limit 304 of −1.0 mile. The clipping function may simply limit the lower range limit to 0.0 miles so that "negative distances" are not provided to the user, or it may employ some other technique.

It should be noted that negative and positive offsets may be the same (symmetrical) or they may differ (asymmetrical). This is because the negative and positive offsets are separately influenced by the negative and positive volatilities, respectively. If battery 30 is discharging at a more volatile rate than it is charging, then the negative offset will likely be larger than the positive offset. In another embodiment, the present method may use some of the steps described above to arrive at a single offset value that is then added and subtracted from a primary range prediction; this is an example of symmetrical offsets, where the negative and positive offsets are determined together, instead of separately. The output that is generated by exemplary method 100 and is presented to the user (e.g., that shown in FIG. 4) not only includes information about the estimated driving range, but it also includes information about the confidence of the prediction. The smaller the offset values and the tighter the overall estimated driving range 320, the more confident the exemplary algorithm is about the estimate; the larger the offset values and the wider the overall estimated driving range, the less confident the exemplary algorithm is about the estimate. Accordingly, the present method may use real-time statistical analysis of the vehicle's power consumption and/or power creation to calculate or otherwise determine the estimated driving range, which includes both range information and confidence information.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. It is not necessary that the negative offset be determined before the positive offset, as the positive offset may be determined first or they may be determined at the same time, for example. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for determining an estimated driving range for a vehicle, comprising the steps of:
    (a) determining an available energy for a battery that may be used for vehicle propulsion;
    (b) using the available energy from step (a) to determine an instantaneous rate of change for the battery;
    (c) using the instantaneous rate of change from step (b) to determine an average rate of change for the battery; and
    (d) using the instantaneous rate of change from step (b) and the average rate of change from step (c) to determine the estimated driving range for the vehicle, wherein the estimated driving range is determined by a control module and includes a range of values that is influenced by a volatility in power consumption and/or power creation regarding the battery.

2. The method of claim 1, wherein step (b) further comprises taking a derivative of the available energy from step (a) as a function of time (d/dt) to determine the instantaneous rate of change for the battery.

3. The method of claim 1, wherein step (c) further comprises filtering the instantaneous rate of change from step (b) with a low-pass filter to produce the average rate of change for the battery.

4. The method of claim 1, wherein step (d) further comprises comparing the instantaneous rate of change from step (b) to the average rate of change from step (c) to determine an error, and the error refers to the difference between the instantaneous and average rates of change.

5. The method of claim 4, wherein step (d) further comprises evaluating the error to determine at least one of a negative error or a positive error, the negative error includes those error values where the instantaneous rate of change is less than the average rate of change, and the positive error includes those error values where the instantaneous rate of change is greater than the average rate of change.

6. The method of claim 5, wherein step (d) further comprises using at least one of the negative error or the positive error to determine at least one of a negative volatility or a positive volatility, the negative volatility refers to the volatility in power consumption, and the positive volatility refers to the volatility in power creation.

7. The method of claim 6, wherein step (d) further comprises converting at least one of the negative volatility or the positive volatility into at least one of a negative offset or a positive offset, and the negative and positive offsets are in units of distance.

8. The method of claim 7, wherein step (d) further comprises at least one of subtracting the negative offset from an initial range estimate to determine a lower range limit, or adding the positive offset to an initial range estimate to determine an upper range limit.

9. The method of claim 1, wherein step (d) further comprises determining an estimated driving range for the vehicle that includes a lower range limit and an upper range limit, and the lower and upper range limits are influenced by the volatility in power consumption and/or power creation regarding the battery.

10. The method of claim 9, wherein the lower range limit and the upper range limit are determined separately so that they are asynchronous.

11. The method of claim 1, further comprising the step of:
    clipping the lower range limit if the estimated driving range becomes too low so that the lower range limit does not include negative values.

12. The method of claim 1, further comprising at least one of the following steps:
    reducing the negative offset so that the estimated driving range is tightened if there is a decrease in power consumption volatility;
    increasing the negative offset so that the estimated driving range is broadened if there is an increase in power consumption volatility;
    reducing the positive offset so that the estimated driving range is tightened if there is a decrease in power creation volatility; or
    increasing the positive offset so that the estimated driving range is broadened if there is an increase in power creation volatility.

13. A method for determining an estimated driving range for a vehicle, comprising the steps of:
    (a) determining an initial range estimate for a battery that may be used for vehicle propulsion;
    (b) determining a negative offset and subtracting the negative offset from the initial range estimate to determine a lower range limit;
    (c) determining a positive offset and adding the positive offset to the initial range estimate to determine an upper range limit; and
    (d) providing an estimated driving range to a user interface in the vehicle, wherein the estimated driving range is provided by a control module and includes the lower range limit and the upper range limit.

14. The method of claim 13, further comprising the steps of:
(i) determining an available energy for the battery;
(ii) using the available energy to determine an instantaneous rate of change for the battery;
(iii) using the instantaneous rate of change to determine an average rate of change for the battery; and
(iv) using the instantaneous rate of change and the average rate of change to determine the negative offset and the positive offset.

15. The method of claim 14, wherein step (iv) further comprises comparing the instantaneous rate of change from step (ii) to the average rate of change from step (iii) to determine an error, and the error refers to the difference between the instantaneous and average rates of change.

16. The method of claim 15, wherein step (iv) further comprises evaluating the error to determine at least one of a negative error or a positive error, the negative error includes those error values where the instantaneous rate of change is less than the average rate of change, and the positive error includes those error values where the instantaneous rate of change is greater than the average rate of change.

17. The method of claim 16, wherein step (iv) further comprises using at least one of the negative error or the positive error to determine at least one of a negative volatility or a positive volatility, the negative volatility refers to the volatility in power consumption, and the positive volatility refers to the volatility in power creation.

18. The method of claim 17, wherein step (iv) further comprises converting at least one of the negative volatility or the positive volatility into at least one of the negative offset or the positive offset, and the negative and positive offsets are in units of distance.

19. The method of claim 13, wherein the lower range limit and the upper range limit are determined separately so that they are asynchronous.

20. The method of claim 13, further comprising the step of:
clipping the lower range limit if the estimated driving range becomes too low so that the lower range limit does not include negative values.

21. The method of claim 13, further comprising at least one of the following steps:
reducing the negative offset so that the estimated driving range is tightened if there is a decrease in power consumption volatility;
increasing the negative offset so that the estimated driving range is broadened if there is an increase in power consumption volatility;
reducing the positive offset so that the estimated driving range is tightened if there is a decrease in power creation volatility; or
increasing the positive offset so that the estimated driving range is broadened if there is an increase in power creation volatility.

* * * * *